July 4, 1967
R. L. CHESNEY
3,329,239
SAWHORSE TOGGLE CLAMP
Filed Oct. 23, 1965
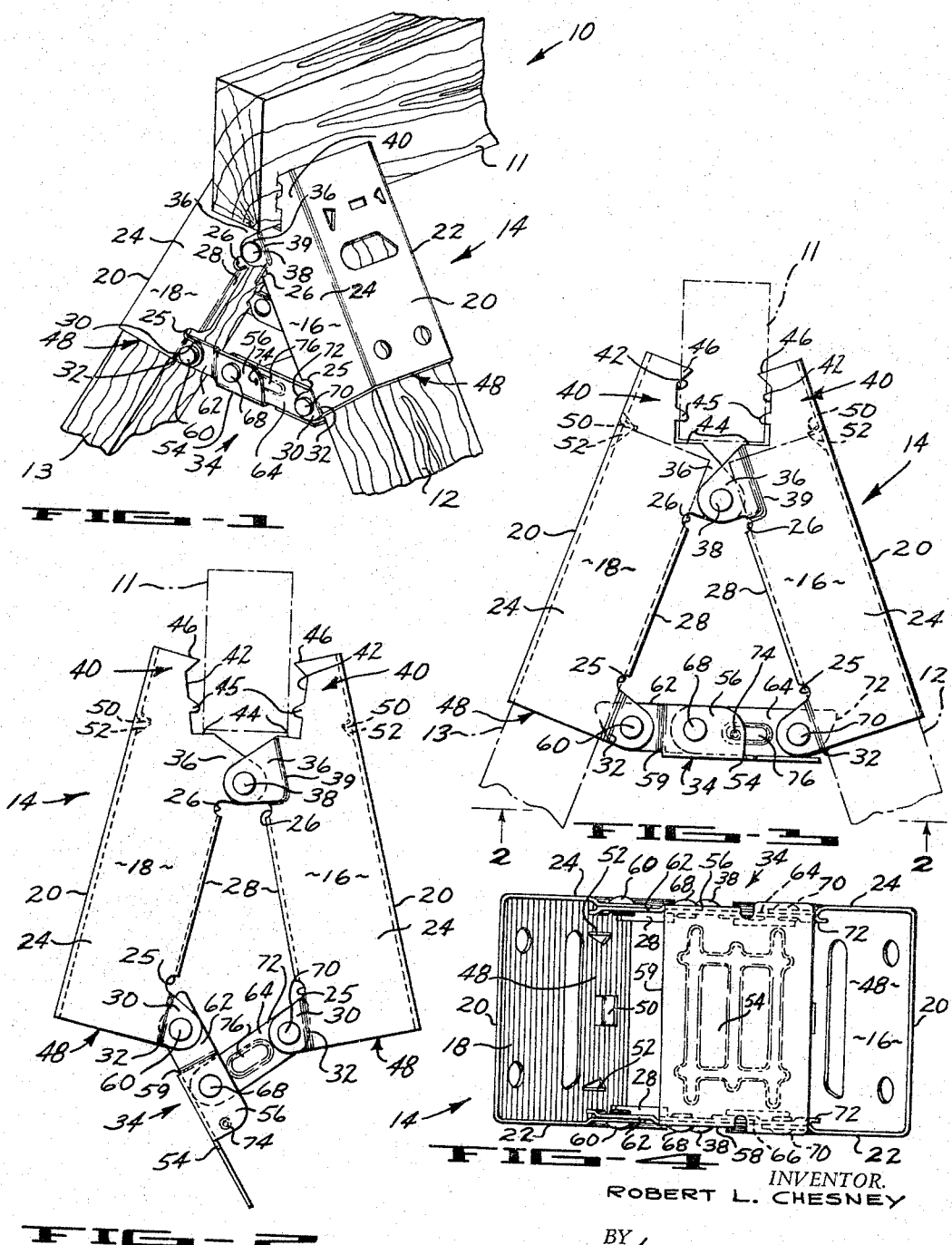
INVENTOR.
ROBERT L. CHESNEY
BY Fulwider, Patton, Rieber,
Lee & Utecht
ATTORNEYS 3,329,239
SAWHORSE TOGGLE CLAMP
Robert L. Chesney, 1935 Clinton St.,
Los Angeles, Calif. 90026
Filed Oct. 23, 1965, Ser. No. 503,592
2 Claims. (Cl. 182—226)

The present invention relates to improvements in clamps for securing legs to a cross piece to form a trestle, such as a sawhorse, and, more particularly, to an improved toggle clamp of the type described in my U.S. Patent No. 2,819,-931, issued Jan. 14, 1958.

My U.S. Patent No. 2,819,931 describes a toggle clamp construction for securing and locking legs to a cross piece to form a trestle, such as a sawhorse. Briefly, the construction includes a pair of channels each having a back wall and a pair of side walls. The side walls of one channel are pivotally secured to the side walls of the other channels such that the portion of each channel above the pivotal connection constitutes a jaw adapted to straddle the cross piece and that portion of each channel below the pivotal connection constitutes a socket adapted to receive one of the legs.

To control movement of the socket portions and to lock the legs in place, the clamp construction further includes a toggle joint assembly between the lower end of the channels. The toggle joint assembly comprises a plate having arms integral therewith and extending in a direction of the plane of the plate and beyond an edge thereof. The ends of the arms are pivotally secured to the outside of respective side walls of one of the channels while a pair of links are pivotally secured to the outside of respective side walls of the other of the channels in the socket portions thereof. The opposite ends of the links are pivotally secured to the arms. The pivotal connection between the links and arms is movable in a direction away from the pivotal connection of the side walls of the channels and beyond a line passing through the pivotal connections of the links and arms of the side walls to collapse the clamp with the socket portions adjacent each other and ready to receive the legs.

In addition to the foregoing, the toggle joint assembly includes a pair of lever arms for each channel. The lever arms of each channel are pivotally connected to the lever arms of the other channel and are adapted to extend into the socket portions to engage and lock the legs in place when the socket portions are spread apart. The lever arms thus perform a very important and necessary function in the toggle clamp construction of my prior patent. Unfortunately, however, they detract materially from the simplicity of the clamp, requiring separate fabrication, mounting, and adjustment. The lever arms also add materially to the over-all cost of the toggle clamp.

Accordingly, it is an object of the present invention to provide a new and improved clamp device having a simplified toggle joint construction for securing and locking legs to a cross piece to form a trestle.

A further object of the present invention is to provide a clamping device of the foregoing character which is rugged and simple in construction and which because of its simplicity can be produced inexpensively.

A further object of the present invention is to provide a trestle which can be readily set up as a sturdy, rigid supporting structure and which can be knocked down easily and quickly to facilitate storage and transportation thereof.

The foregoing as well as other objects and advantages of the present invention may be more clearly understood by reference to the following detailed description when taken with the drawing which, by way of example only, illustrates one form of toggle clamp construction including the features of the present invention.

In the drawing:
FIGURE 1 is a perspective view of an end portion of a sawhorse including the toggle clamp construction;
FIGURE 2 is an end view of the toggle clamp construction shown in a collapsed position;
FIGURE 3 is an end view of a toggle clamp construction shown in an expanded position; and
FIGURE 4 is a bottom view of the toggle clamp construction taken along the line 4—4 in FIGURE 3.

In FIGURE 1, an upper corner of a sawhorse is represented generally by the numeral 10 and comprises a horizontal cross piece 11, two legs 12 and 13 and a clamp 14 which releasably secures the legs to the cross piece.

In brief, the clamp 14 operates as a pincers and is movable between a generally collapsed position, illustrated in FIGURE 2, and an expanded position, illustrated in FIGURES 1 and 3. In the collapsed position, the clamp 14 is adapted to loosely receive the cross piece 11, and the legs 12 and 13. In the expanded position, however, the clamp 14 tightly grips the cross piece 11 and legs 12 and 13 to secure the legs to the cross piece, thereby producing a sawhorse of a sturdy and rigid construction.

More particularly, the clamp 14 comprises two similar channels 16 and 18, each including a flat bottom wall 20 and right and left side walls 22 and 24 normal to the bottom wall. The side walls 22 and 24 are of similar construction and each includes a pair of spaced slits 25 and 26 cut inwardly from its longitudinal edge to provide a free portion between the slits. The free portions are bent inwardly parallel to bottom walls 20 to form flanges 28 for holding the legs 12 and 13 of the sawhorse straight within the associated channels. Adjacent each slit 25 is an outwardly projecting ear 30. The ears 30 are set in from the plane of the side walls 22 and 24 by offsets 32 and provide connection points for a toggle joint assembly 34 which will be described in detail later. Adjacent each slit 26, is an outwardly projecting ear 36 providing means for pivotally attaching the channels 16 and 18 with pins 38. The ears 36 of the channel 16 are set back from the plane of the side walls 22 and 24 by an offset 39 so that the surfaces between the pivotally connected ears 36 of the channels 16 and 18 will lie flush against each other.

The portions of the channels 16 and 18 extending upwardly beyond the ears 36 are referred to as the jaws 40 for the clamp 14. As illustrated most clearly in FIGURES 2 and 3, the jaws 40 are defined by notches 42 in the side walls 22 and 24, each forming edge portions 44 and a pair of teeth 45 and 46. The edge portions 44 are disposed at an angle with respect to the bottom walls 20 such that when the channels 14 and 18 are spread apart, the edges 44 lie in a horizontal plane forming a rest for the bottom surface of the cross piece 11. Similarly, the teeth 45 and 46 are constructed such that when the channels 14 and 18 are moved toward each other, such as shown in FIGURE 2, the teeth are spread apart to receive the cross piece 11, while when the channels are spread apart, they cut into the cross piece to hold the cross piece firmly in place.

The portions of the channels 16 and 18 extending downwardly beyond the ears 36 are referred to as the socket portions 48 of the clamp 14 and are adapted to longitudinally receive the upper end portions of the legs 12 and 13. Within the channels, the upper ends of the legs 12 and 13 engage similar stop members 50 extending inwardly from the bottom walls 20. In the illustrated form, the stop members 50 comprise lugs struck from the bottom walls and bent inwardly substantially at right angles thereto. Also within the channels, the upper ends of the legs 12 and 13 engage projecting teeth 52 which bite into the upper edge of the legs to secure the legs within the channels. In the illustrated form the teeth 52 are struck from the bottom walls 20 and bent inwardly into the channels to engage the legs just below the stop members 50.

To control movement of the channels 16 and 18 between the expanded and collapsed positions, as well as to further lock the legs 12 and 13 in place, the toggle joint assembly 34 is included between the socket portions 48 of the channels. The toggle joint assembly 34 comprises a substantially rectangular plate 54, having two side arms 56 and 58 integral with opposite sides of the plate and bent upwardly at right angles from the plane of the plate, and a pair of links 64 and 66. The side arms 56 and 58 extend beyond an end edge 59 of the plate 54 and are pivotally secured by pins 60, between the end edge and inwardly offset outer end portions 62, to the inside faces of the respective ears 30 of the channel 18. Thus connected, the outer end portions 62 lie in generally parallel planes extending well into the socket portion 48 of the channel 18. The links 64 and 66 are pivotally secured at one end by pins 68 to inside faces of the arms 56 and 58, respectively, and are also pivotally secured by pins 70, adjacent inwardly offset end portions 72, to the inside faces of the respective ears 30 of the channel 16. Thus connected, the end portions 72 lie in substantially parallel planes extending well into the socket portions 48 of the channel 16.

The side edges of the plate 54 extend laterally beyond the links 64 and 66 to prevent the plate from swinging upwardly past the links when the channels 16 and 18 are spread apart in the expanded position. Also, the pivot pins 68 are spaced above the plate 54 a distance greater than the distance of the pins 70 from the plate. Thus in spreading the channels apart, the plate 54 swings on the pivot pins 60 until it strikes the bottom edges of the links 64 and 66. In that position, the center of the pins 68 is slightly above a line passing through the center of the pins 60 and 70, thereby locking the channels 16 and 18 in their expanded position. The locking of the clamp 14 is made even more secure by the engagement of the dimple 74 with a depression 76 formed in the outside face of the link 64.

As illustrated most clearly in FIGURES 2 and 3, the outer end portions 62 and 72 of the side arms and links are generally tooth-like, each having a longitudinally extending top edge and an upwardly inclined bottom edge extending from adjacent the associated pivot pin upwardly to the associated top edge. Thus shaped, the end portions 62 and 72 pivot with the arms 56, 58 and links 64, 66 to a position outside the socket portions 48 when the clamp 14 is collapsed (see FIGURE 2), thereby allowing entry of the legs 12 and 13 into the channels 14 and 18. When the clamp 14 is expanded, however (see FIGURE 3), the end portions 62 and 72 pivot with the arms and links into the socket portions 48 to cut into the inside edges of and secure the legs 12 and 13 in place within the channels 16 and 18.

Thus, to construct a sawhorse with clamps of the present invention, a cross piece of desired length is placed on a floor and a clamp positioned on the cross piece with the jaws 40 extending downwardly along opposite faces of the cross piece. The legs are then inserted into the channels 16 and 18 and pushed downwardly until the end faces engage the stop means 50 and the teeth 52 cut into the end edges adjacent the bottom walls 20 of the channel.

With the legs extending upwardly from the cross piece, the legs are pushed apart and foot pressure applied to the plate 54 of the toggle joint assembly 34 to spread apart the socket portions 48 and to close the jaws 40 against opposite side faces of the cross piece. The spreading of the socket portions 48 also moves the outer ends 62 and 72 of the arms and links into the socket portions to cut into the legs and thereby secure the legs in the channels. Further downward movement of the plate 54 moves the pivot pins 68 past the center of the pins 60 and 70 to lock the clamp 14 in its expanded position.

To complete the sawhorse, another pair of legs are secured to the cross piece with a second clamp in the foregoing manner. The sawhorse is then ready to be turned upright and be put into use.

To disassemble the sawhorse, the plates 54 are simply lifted in a direction away from the pins 38 to open the jaws 40 and release the end portions 62 and 72 of the arms and links from the legs.

Thus, the clamp 14 allows for simple and rapid assembly of the cross piece and legs to form a sturdy sawhorse which may be simply and rapidly disassembled for shipment or storage. Also, the toggle joint assembly 34 of the clamp 14 is much simplified over prior assemblies included in clamps for forming trestles.

While in the foregoing, a particular form of toggle clamp construction has been described in some detail, changes and modifications may occur to those skilled in the art without departing from the spirit of the present invention. It is therefore intended that the present invention be limited in scope only by the terms of the following claims.

I claim:
1. A clamp for anchoring legs to a cross piece of a trestle, comprising:
   a pair of channels, each channel having a block wall and a pair of side walls;
   first pivot means securing the side walls of one channel to the side walls of the other channel, that portion of each channel above said first pivot means constituting a jaw, said jaws being adapted to clamp against opposite side faces of the cross piece, that portion of each channel below said first pivot means constituting a socket, said sockets being adapted to receive end portions of the legs;
   and a toggle joint assembly positioned between said channels and comprising a plate, a pair of arms integral with the plate and extending in a direction of the plane of the plate and beyond an edge of the plate, second pivot means securing one end of each of said arms to the inside of the respective side walls of one of said channels in the socket portion thereof, a pair of links, third pivot means securing one end of said links to the inside of said respective side walls of the other of said channels in the socket portion thereof, fourth pivot means interconnecting the ends opposite said one end of the respective arms and links and movable in a direction away from the said first pivot means beyond a line passing through said second and third pivot means, said plate extending outwardly beyond the links, and end portions of said arms and links extending beyond said second and third pivot means and away from said fourth pivot means for projecting into respective channels and engaging the legs when said toggle joint is locked to secure said socket portions spread apart.

2. The clamp of claim 1, wherein said end portions of said arms and links are generally triangular in shape including longitudinally extending upper edges and longitudinally inclined lower edges extending from adjacent said second and third pivot means respectively upwardly to said upper edges to define teeth for engaging and piercing the legs when said socket portions are spread apart.

References Cited

UNITED STATES PATENTS 2,819,931  1/1958  Chesney _____ 182—226

FOREIGN PATENTS 483,851  6/1952  Canada.

REINALDO P. MACHADO, *Primary Examiner.*